United States Patent
Bonner et al.

[15] 3,679,907
[45] July 25, 1972

[54] LITHIUM FORMATE NONLINEAR DEVICES

[72] Inventors: William Adam Bonner, Scotch Plains; Shobha Singh, Summit; Le Grand Gerard Van Uitert, Morris Township, Morris County, all of N.J.

[73] Assignee: Bell Telephone Laboratories, Incorporated, Murray Hill, N.J.

[22] Filed: Aug. 3, 1970

[21] Appl. No.: 60,697

[52] U.S. Cl. ................................307/88.3, 321/69 R, 330/4.5
[51] Int. Cl. ............................................................H03f 7/00
[58] Field of Search...................................307/88.3; 321/69; 330/4.5–4.6

Primary Examiner—Roy Lake
Assistant Examiner—Darwin R. Hostetter
Attorney—R. J. Guenther and Edwin B. Cave

[57] ABSTRACT

The hydrated and deuterated forms of lithium formate are found to be useful nonlinear materials for use over a wavelength range including the visible spectrum. While conversion efficiency is inferior to that of lithium niobate or barium sodium niobate, resistance to radiation damage is significantly greater. Operation at power levels in excess of $10^6$ watts/cm$^2$ has resulted in no perceptible damage. These materials are suitably incorporated in second harmonic generators as well as in other parametric devices.

5 Claims, 1 Drawing Figure

PATENTED JUL 25 1972
3,679,907
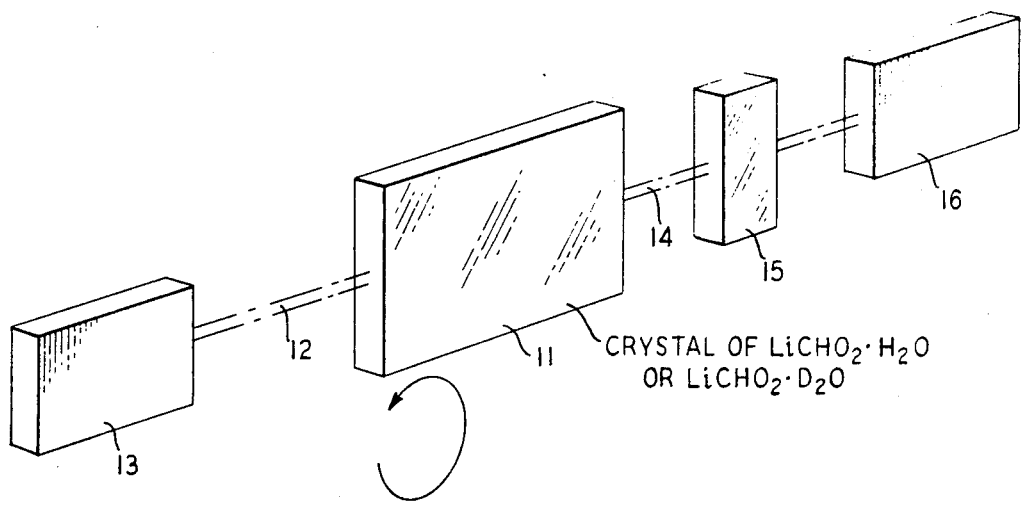
INVENTORS W. A. BONNER
S. SINGH
L. G. VAN UITERT
BY
ATTORNEY

LITHIUM FORMATE NONLINEAR DEVICES

BACKGROUND OF THE INVENTION

1. Field of the Invention

The invention is concerned with frequency conversion of electromagnetic radiation over a bandwidth including the visible spectrum through the use of nonlinear materials. Such conversion may take the form of second harmonic generation and of other parametric interactions as, for example, frequency downshifting, frequency mixing, etc.

2. Description of the Prior Art

The past decade has seen a significant body of art develop as a consequence of the invention of the laser oscillator. This source of coherent electromagnetic radiation at wavelengths in and near the visible spectrum has had significant impact in many fields. There are now a variety of operative laser mechanisms which utilize, inter alia, solid, liquid, and gaseous media. Related developments have resulted in a variety of devices for controlling and for modifying the laser radiation.

Many contemplated uses of coherent radiation require a variety of radiation wavelengths, sometimes a continuum over at least a significant portion of the spectrum. There have been studies and resultant developments designed to meet this requirement in the oscillator itself. A second approach, probably of more immediate practical interest, has been directed toward the development of ancillary elements for changing the frequency of a fixed frequency oscillator.

The most promising class of such ancillary elements depends on nonlinearity, i.e., the nonlinear response of the polarization of the medium, to the amplitude of the wave. Devices based on this phenomenon may take various form. One form in prevalent use at this time is the SHG (or second harmonic generator). A second form of considerable interest is the parametric downshifter which may be used in combination with an SHG or may be used independently to produce a range of wavelengths longer than that introduced into this element.

An early nonlinear material and one which is still in use is KDP (potassium dihydrogen phosphate). This material is easily grown in large crystalline sections of requisite perfection and it has become the standard by which later developed materials have been judged. One such later material is lithium niobate (nominally $LiNbO_3$). Based on its use as an SHG with a fundamental wavelength of $1.06\mu$ (microns), its conversion efficiency is about two orders of magnitude greater than that of KDP. Incorporation in nonlinear devices has, however, been limited by its susceptibility to radiation damage (the development of local refractive index inhomogeneities which produce light scattering). This damage, which takes place at power levels of the order of $10^2$ watts per square centimeter in a reasonably short period of time, is of consequence even in CW (continuous wave) use. Since the damage may be annealed out, there has been some operation at elevated temperatures (above 170° C.) which avoids the formation of light scattering centers. See Vol. 12, Applied Physics Letters, 186 (1968).

Probably the most promising material in CW nonlinear use at this time is a mixed crystal of barium sodium niobate. Its conversion efficiency is somewhat improved relative to lithium niobate and, more important, it is free of radiation damage under many operational conditions. Even this material, however, shows damage in pulsed operation at power levels in excess of $10^5$ watts per square centimeter. The damage in barium sodium niobate appears to be largely a surface phenomenon, and the possibility exists that it may yet be avoided even in such high power use by appropriate encapsulation and/or environmental control.

SUMMARY OF THE INVENTION

Lithium formate in either its hydrated or deuterated form has useful nonlinear properties over its transparency range which includes the visible spectrum. Crystalline material of suitable optical properties is readily grown from aqueous solution. Frequency conversion efficiency is intermediate that of KDP and lithium niobate (an order of magnitude greater than the former and an order of magnitude less than the latter). Most significantly, long-term exposure to pulsed laser radiation at power levels in excess of $10^8$ watts/cm$^2$ reveals no radiation damage.

BRIEF DESCRIPTION OF THE DRAWING

The FIGURE is a schematic view of a nonlinear device using a material of the invention.

DETAILED DESCRIPTION

Composition

While modifications are possible, the essential properties of the inventive materials depend upon either $LiCHO_2 \cdot H_2O$ or $LiCHO_2 \cdot D_2O$. Lithium formate monohydrate or monodeuterate crystalizes in the orthorhombic system (class mm 2, space group Pbn) with the lattice constants, $c = 4.85$ A., $a = 6.49$ A. and $b = 10.01$ A. There are 4 molecules in the unit cell and the density is 1.46 g/cm$^3$. See I. Nitta, *Scientific Papers*, Institute of Physical and Chemical Research, Tokyo, Vol. 9, p.151 (1928).

Possible modifications include substitution of deuterium for the hydrogen bonded to the carbon in the $CHO_2$ ion.

GROWTH

Lithium formate may be grown from aqueous solution, for example, by slow cooling. Resulting crystals may be oriented by X-ray or by other techniques and may be simply polished with diamond paste. The polished crystal may be protected from dehydration either by maintenance in a suitably moist atmosphere or by contacting encapsulation. Illustrative examples of growth runs are set forth. Since growth is carried out from simple water solution (or $D_2O$ solution) with no additional ingredients, details of growth may vary over a broad range of conditions, for example, considerable variation is permissible in concentration, temperature, rate of dropping temperature (where such technique is used), use of seeds where desired, etc.

GROWTH EXAMPLE I

A glass container of 2 ½ liter capacity was partially filled with water and $LiCHO_2 \cdot H_2O$ powder was added with stirring at 35° C. until the solution was at or near saturation (the solubility is about 28 gms/100cc at 20° C. and 40 gms/100cc at 35° C.). A rotating seed holder with seed crystals attached was introduced and the whole was cooled at 0.1° C. per day resulting in growth of the order of 20 mils per day on the seed.

GROWTH EXAMPLE II

Starting with the same apparatus and starting ingredients, a similar growth rate resulted by use of constant temperature (about 35° C.) while allowing the solvent to evaporate. For example, this may be controlled by passing dry $N_2$ over the surface in an otherwise sealed container. A typical flow rate for the growth indicated at 35° C. would be 10cc/hour.

GROWTH EXAMPLE III

The deuterated modification was produced by growing a crystal in accordance with Growth Example I except that the starting powder was first dehydrated by heating to 100° C. for a week in air or inert gas and then dissolving the material in $D_2O$ and growing from $D_2O$ rather than $H_2O$.

OPTICAL PROPERTIES

Lithium formate is essentially transparent from about $0.25\mu$ to about $1.2\mu$. The principal indices of refraction of lithium formate as a function of wavelength were obtained by the method of minimum deviation. A least squares fit of a single term Sellmeier formula to the data yielded the following values for the Sellmeier constants.

$S_{o(x)} = 0.8415$  $\lambda_{o(x)} = 0.0953 \mu m$
$S_{o(y)} = 0.9999$ and $\lambda_{o(y)} = 0.1183 \mu m$
$S_{o(z)} = 1.2454$  $\lambda_{o(z)} = 0.12496 \mu m$ where the subscripts in parenthesis represent the principal axes (see *Fundamentals of Optics*, F. A. Jenkins and G. E. White, 2nd.Ed., McGraw-Hill (1950) p.469). The principal axes $x$, $y$, and $z$ were found to be parallel to the crystallographic axes $a$, $b$, and $c$, respectively. Using the measured values of the refractive indices at $0.5321\mu$, the optic angle $2V_z$ was calculated to be $123.72°$ indicating that the crystals were negative biaxial. The measured value of $2V_z$ for $0.5321\mu$ light was $123.8°$.

The nonlinear optical properties of lithium formate were investigated by the method of observing the second harmonic intensities generated using the $1.064\mu m$ fundamental from a repetitively Q-switched $Nd^{3+}$:YAlG laser. The second order polarizability components for the point group mm2 are given by $P_x^{2\omega} = 2d_{15}E_xE_z$
$P_y^{2\omega} = 2d_{24}E_yE_z$
$P_z^{2\omega} = d_{31}E_x^2 + d_{32}E_y^2 + d_{33}E_z^2$ (1) where $E$ are the components of the optical electric field of the fundamental. From Kelinman's symmetry condition, $d_{15} = d_{31}$ and $d_{24} = d_{32}$ (Vol. 126 *Physical Review*, p.1,977 (1962)). By observing the second harmonic fringes, the useful nonlinear optical coefficients of lithium formate were estimated to be several times that of $d_{11}$ of $\alpha$-quartz.

An examination of index of refraction data and Eq. (1) reveals that phase-matchable second harmonic generation is possible in lithium formate for a large number of fundamental wavelengths in the visible and near infrared.

EXAMPLE $LiCHO_2 \cdot H_2O$ was operated as a second harmonic generator in the type of apparatus schematically depicted in the FIGURE utilizing an $Nd^{3+}$:YAlG laser operating at $1.06\mu m$. The laser was Q-switched and the pulsed output was of a power level of approximately $5 \times 10^6$ watts/cm$^2$ with a pulse length of the order of $0.3\mu$ sec. Output was at 0.5321 and operation was continued for a period of about 10 hours (approximately $10^8$ pulses). Detailed examination of the crystal after the operation with a view to detecting refractive index inhomogeneities revealed no light scattering mechanism.

THE FIGURE

In the figure, there is depicted a single crystal body 11 of a material of the invention. A coherent electromagnetic beam 12 produced by source 13 is introduced into body 11, as shown. The resultant emerging beam 14 is then caused to pass through filter 15, and, upon departing, is detected by apparatus 16. For the SHG case, beam 12 is of a fundamental frequency while departing beam 14 additionally contains a wave of a frequency corresponding with the first harmonic of beam 12. Filter 15 is of such nature as to pass only the wave of concern, in the SHG instance that of the harmonic. Apparatus 16 senses only that portion of the beam leaving filter 15.

The device of the figure may similarly be regarded as a three-frequency device, with beam 12 containing frequencies to be mixed or consisting of a pump frequency. Under these conditions, exiting beam 14 contains signal and idler frequencies as well as pump, representing three distinct values for nondegenerate operation. For any operation, whether two frequencies or three, efficiency is increased by resonance. Such may be accomplished by coating the surfaces of crystal 11, through which the beam enters and exits. This coating may be partially reflecting only for a generated frequency as, for example, for the harmonic in SHG. For the three-frequency case, it is desirable to support both generated frequencies. In most instances, this cannot be accomplished by coating the face of the crystal, and it is necessary to provide at least one spaced adjustable mirror which may be positioned at such distance from the face of the crystal 11 as to support the frequencies of concern. Simultaneous support of the pump frequency may similarly be accomplished. However, the complication so introduced is justified only when the pump level requires it.

OTHER CONSIDERATIONS

It has been indicated that the crystalline materials may dehydrate when the relative humidity is very low; for example, under desiccator conditions. The deuterated form is no different in this respect and both materials must be protected from extremely low humidity conditions where long-term storage or use is contemplated. A simple method for protecting the material is encapsulation within a vessel with a suitable $H_2O$ or $D_2O$ environment. An alternative approach is to coat the surfaces of concern with a suitably transparent material.

While the main advantage of the inventive materials derives from their radiation resistance at high power levels, other properties may suggest use at lower power levels. For example, as compared with lithium niobate and barium sodium niobate, the shorter wavelength absorption edge of about 0.25 micron (the other materials have significant absorption at about 0.4 micron) may suggest CW or pulsed use for redoubling from, for example, a $1.06\mu$ YAG-Nd laser. The broader transparency bandwidth also suggests other parametric applications including those at power levels within the capability of that of other materials.

While the invention is directed to device use of the described materials, it has not been considered appropriate to this description to describe suitable device designs in great detail. For example, reference to means for introducing and extracting radiation may allude simply to the optically polished surfaces or may include wavelength selective media as, for example, the multiple layer refraction mirrors prevalent in the laser art. Other ancillary apparatus may include wavelength sensitive deflectors, for example, fixed gratings or acousto-optic elements, etc. Articles describing suitable devices are given in Vol.12, *Applied Physics Letters*, p.306 (1968), Vol.12, *Applied Physics Letters*, p.308 (1968) and Vol.57 *Proceedings of the IEEE*, p.2,096 (1969).

What is claimed is:

1. Device comprising a crystalline body consisting essentially of a single crystal, said crystal being transparent to electromagnetic wave energy together with first means for introducing a beam of coherent electromagnetic radiation containing a first frequency component into said body and second means for extracting a beam of coherent electromagnetic radiation containing a second frequency component different from the first frequency component from said body, characterized in that said body consists essentially of a composition which may be represented by an approximate formula selected from the group consisting of $LiCHO_2 \cdot H_2O$, $LiCDO_2 \cdot H_2O$, $LiCHO_2 \cdot D_2O$ or $LiCDO_2 \cdot D_2O$.

2. Device of claim 1 in which at least one of said means comprises an optically polished surface.

3. Device of claim 1 in which the birefringence of the said body is at least as great as the dispersion in velocity of the two said frequencies within the said body and in which the said body is positioned so that the direction defined by the said incoming beam and the optic axis is such that an ordinary wave of one of the said frequencies within the said body is phase matched to an extraordinary wave of another of the said frequencies within the body.

4. Device of claim 3 together with resonant means for supporting a standing wave of at least one of the said frequencies in the said body.

5. Device of claim 4 in which there are coherent electromagnetic waves of three frequencies within the said body and the frequency relationship is such that the greatest is equal to the sum of the other two.

* * * * *

UNITED STATES PATENT OFFICE
CERTIFICATE OF CORRECTION

Patent No. 3,679,907          Dated July 25, 1972

Inventor(s) W.A.Bonner, S.Singh, L.G.Van Uitert

It is certified that error appears in the above-identified patent and that said Letters Patent are hereby corrected as shown below:

Col. 3, line 23, delete "where";

line 24, delete "E' ";

line 25, insert --where E's-- before "are" at the beginning of the line;

line 26, delete "Kelinman's" and insert --Kleinman's--.

Signed and sealed this 9th day of January 1973.

(SEAL)
Attest:

EDWARD M.FLETCHER,JR.          ROBERT GOTTSCHALK
Attesting Officer                Commissioner of Patents